US008420264B2

(12) United States Patent
Manev et al.

(10) Patent No.: US 8,420,264 B2
(45) Date of Patent: Apr. 16, 2013

(54) METHOD FOR PREPARING A LITHIUM ION CELL

(75) Inventors: Veselin Manev, Reno, NV (US); John Shelburne, Sparks, NV (US)

(73) Assignee: Altairnano, Inc., Reno, NV (US)

( * ) Notice: Subject to any disclaimer, the term of this patent is extended or adjusted under 35 U.S.C. 154(b) by 1421 days.

(21) Appl. No.: 12/056,218

(22) Filed: Mar. 26, 2008

(65) Prior Publication Data

US 2009/0117470 A1   May 7, 2009

Related U.S. Application Data

(60) Provisional application No. 60/909,361, filed on Mar. 30, 2007.

(51) Int. Cl.
*H01M 10/058* (2010.01)
*H01M 10/0525* (2010.01)
*H01M 4/13* (2010.01)
*H01M 4/1391* (2010.01)
*B02C 19/06* (2006.01)

(52) U.S. Cl.
USPC .............. 429/231.95; 429/218.1; 29/623.1; 241/5; 241/39

(58) Field of Classification Search .......... 429/209–246; 29/623.1
See application file for complete search history.

(56) References Cited

U.S. PATENT DOCUMENTS

| | | | |
|---|---|---|---|
| 3,765,921 A | 10/1973 | Puskar |
| 3,903,239 A | 9/1975 | Berkovich |
| 4,012,338 A | 3/1977 | Urwin |
| 4,058,592 A | 11/1977 | Quets |
| 4,065,544 A | 12/1977 | Hamling et al. |
| 4,189,102 A | 2/1980 | Andrews |
| 4,219,164 A | 8/1980 | Taylor |
| 4,482,642 A | 11/1984 | Ettlinger et al. |
| 4,502,641 A | 3/1985 | Coombe |
| 4,546,926 A | 10/1985 | Niemi |
| 4,649,037 A | 3/1987 | Marsh et al. |
| 4,664,319 A | 5/1987 | Andrews |
| 4,842,832 A | 6/1989 | Inoue et al. |
| 4,923,682 A | 5/1990 | Roberts et al. |

(Continued)

FOREIGN PATENT DOCUMENTS

| | | |
|---|---|---|
| DE | 4447578 A1 | 4/1996 |
| DE | 19725616 C1 | 11/1998 |

(Continued)

OTHER PUBLICATIONS

Colbow, K. M. et al. (1989). "Structure and Electrochemistry of the Spinel Oxides $LiTi_2O_4$ and $Li_{4/3}Ti_{5/3}O_4$," *Journal of Power Sources* 26:397-402.

(Continued)

*Primary Examiner* — Jonathan Crepeau
*Assistant Examiner* — Jacob Buchanan
(74) *Attorney, Agent, or Firm* — Yudell Isidore Ng Russell PLLC

(57) ABSTRACT

The apparatus and methods described herein generally relate to a method for preparing electrodes for lithium ion cells, where both the positive and negative electrodes of the cell include metal oxides processed according to the methods described herein.

12 Claims, 5 Drawing Sheets

U.S. PATENT DOCUMENTS

| | | | |
|---|---|---|---|
| 4,944,936 A | 7/1990 | Lawhorne | |
| 4,999,182 A | 3/1991 | Baumard et al. | |
| 5,036,037 A | 7/1991 | Kladnig et al. | |
| 5,068,056 A | 11/1991 | Robb | |
| 5,114,702 A | 5/1992 | Pederson et al. | |
| 5,133,504 A | 7/1992 | Smith et al. | |
| 5,160,712 A | 11/1992 | Thackeray et al. | |
| 5,173,455 A | 12/1992 | Terbot et al. | |
| 5,478,671 A | 12/1995 | Idota | |
| 5,545,468 A | 8/1996 | Koshiba et al. | |
| 5,550,095 A | 8/1996 | Naito et al. | |
| 5,562,763 A | 10/1996 | Bruckner et al. | |
| 5,654,114 A | 8/1997 | Kubota et al. | |
| 5,698,177 A | 12/1997 | Pratsinis et al. | |
| 5,698,205 A | 12/1997 | Bruckner et al. | |
| 5,714,260 A | 2/1998 | Okuda et al. | |
| 5,766,796 A | 6/1998 | Abraham et al. | |
| 5,770,310 A | 6/1998 | Noguchi et al. | |
| 5,807,532 A | 9/1998 | Takahashi et al. | |
| 5,833,892 A | 11/1998 | Gurav et al. | |
| 5,840,111 A | 11/1998 | Wiederhoft et al. | |
| 6,001,326 A | 12/1999 | Kim et al. | |
| 6,037,289 A | 3/2000 | Chopin et al. | |
| 6,080,510 A | 6/2000 | Hemmer et al. | |
| 6,099,634 A | 8/2000 | Uenishi et al. | |
| 6,136,476 A * | 10/2000 | Schutts et al. | 429/231.95 |
| 6,139,815 A | 10/2000 | Atsumi et al. | |
| 6,168,884 B1 | 1/2001 | Neudecker et al. | |
| 6,274,271 B1 | 8/2001 | Koshiba et al. | |
| 6,310,464 B1 | 10/2001 | Koo | |
| 6,348,182 B1 | 2/2002 | Lu et al. | |
| 6,375,923 B1 | 4/2002 | Duyvesteyn et al. | |
| 6,379,843 B1 | 4/2002 | Yamasaki et al. | |
| 6,409,985 B1 | 6/2002 | Numata et al. | |
| 6,440,383 B1 | 8/2002 | Duyvesteyn et al. | |
| 6,447,739 B1 | 9/2002 | Krynitz et al. | |
| 6,475,673 B1 | 11/2002 | Yamawaki et al. | |
| 6,548,039 B1 | 4/2003 | Duyvesteyn et al. | |
| 6,645,673 B2 | 11/2003 | Yamawaki et al. | |
| 6,673,491 B2 | 1/2004 | Shirakawa et al. | |
| 6,680,041 B1 | 1/2004 | Kumar et al. | |
| 6,689,716 B2 | 2/2004 | Sabacky et al. | |
| 6,719,821 B2 | 4/2004 | Yadav et al. | |
| 6,737,037 B2 | 5/2004 | Ramasamy et al. | |
| 6,749,648 B1 | 6/2004 | Kumar et al. | |
| 6,759,168 B2 | 7/2004 | Yamasaki et al. | |
| 6,789,756 B2 | 9/2004 | Beliavsky et al. | |
| 6,790,243 B2 | 9/2004 | Vaidyanathan | |
| 6,881,393 B2 | 4/2005 | Spitler et al. | |
| 6,890,510 B2 | 5/2005 | Spitler et al. | |
| 6,908,711 B2 | 6/2005 | Fauteux et al. | |
| 6,974,566 B2 | 12/2005 | Sabacky et al. | |
| 6,982,073 B2 | 1/2006 | Sabacky et al. | |
| 7,026,074 B2 | 4/2006 | Chen et al. | |
| 7,060,390 B2 | 6/2006 | Chen et al. | |
| 7,087,349 B2 | 8/2006 | Kim et al. | |
| 7,101,642 B2 | 9/2006 | Tsukamoto et al. | |
| 7,115,339 B2 | 10/2006 | Nakajima et al. | |
| 7,122,278 B1 * | 10/2006 | Nakashima et al. | 429/224 |
| 2001/0031401 A1 | 10/2001 | Yamawaki et al. | |
| 2003/0155454 A1 * | 8/2003 | Beliavsky | 241/5 |
| 2004/0197657 A1 | 10/2004 | Spitler et al. | |
| 2005/0069777 A1 * | 3/2005 | Takami et al. | 429/245 |
| 2005/0169833 A1 | 8/2005 | Spitler et al. | |
| 2005/0186481 A1 | 8/2005 | Ogawa et al. | |
| 2006/0286456 A1 | 12/2006 | Fu et al. | |
| 2007/0009798 A1 * | 1/2007 | Inagaki et al. | 429/231.1 |
| 2007/0092798 A1 | 4/2007 | Spitler | |

FOREIGN PATENT DOCUMENTS

| | | |
|---|---|---|
| DE | 19837625 A1 | 3/1999 |
| EP | 0016583 B1 | 10/1983 |
| EP | 0090913 B1 | 8/1986 |
| EP | 0356132 B1 | 4/1995 |
| EP | 0617474 B1 | 7/1997 |
| EP | 0646974 B1 | 9/1997 |
| EP | 1057783 A2 | 12/2000 |
| EP | 0832847 B1 | 4/2002 |
| EP | 0827231 B1 | 1/2004 |
| EP | 0845825 B1 | 1/2004 |
| EP | 1026765 B1 | 11/2004 |
| GB | 481892 | 3/1938 |
| GB | 497694 | 12/1938 |
| GB | 2166126 A | 4/1986 |
| GB | 2328684 A | 3/1999 |
| JP | 58-015031 | 1/1983 |
| JP | 03-115106 | 5/1991 |
| JP | 06-275263 | 9/1994 |
| JP | 09-309727 | 12/1997 |
| JP | 10-064592 | 3/1998 |
| JP | 10-069922 | 3/1998 |
| JP | 10-509683 | 9/1998 |
| JP | 2000-302547 | 10/2000 |
| JP | 2002-289194 | 10/2002 |
| SU | 1457995 A1 | 2/1989 |
| WO | WO-94/08719 A1 | 4/1994 |
| WO | WO-97/10185 A1 | 3/1997 |
| WO | WO-97/30130 A1 | 8/1997 |
| WO | WO-98/37023 A1 | 8/1998 |
| WO | WO-98/41476 A1 | 9/1998 |
| WO | WO-98/52694 A1 | 11/1998 |
| WO | WO-01/00531 A1 | 1/2001 |
| WO | WO-01/60515 A2 | 8/2001 |
| WO | WO-02/09215 A2 | 1/2002 |
| WO | WO-02/46101 A2 | 6/2002 |
| WO | WO-2004/097961 A2 | 11/2004 |
| WO | WO-2007/048142 A2 | 4/2007 |

OTHER PUBLICATIONS

Harrison, M. R. et al. (1985). "The Superconductor-Semiconductor Transition in the $Li_{1+x}Ti_{2-x}O_4$ Spinel System," *Philosophical Magazine B* 52:679-699.

International Search Report and Written Opinion mailed Sep. 24, 2007, for PCT Application No. PCT/US06/60164 filed Oct. 23, 2006, 9 pages.

International Search Report mailed Jul. 15, 2003, for PCT Application No. PCT/US03/06989 filed Mar. 7, 2003, 3 pages.

International Search Report mailed Oct. 28, 2002, for PCT Application No. PCT/US02/23037 filed Jul. 19, 2002, 3 pages.

International Search Report mailed on Nov. 11, 2002, for PCT Application No. PCT/CH02/00425 filed on Feb. 13, 2003, 3 pages.

Kavan, L. et al. (2000), "Surfactant-Templated $TiO_2$ (Anatase): Characteristic Features of Lithium Insertion Electrochemistry in Organized Nanostructures," *Journal of Physical Chemistry B* 104(50):12012-12020.

Kavan, L. et al. (Feb. 1996). "Nanocrystalline $TiO_2$ (Anatase) Electrodes: Surface Morphology, Adsorption, and Electrochemical Properties," *Journal of the Electrochemical Society* 143(2):394-400.

Lundblad, A. et al. (2000). "Effect of Sintering Procedures in Development of $LiCoO_2$-Cathodes for the Molten Carbonate Fuel Cell," *Journal of Power Sources* 90:224-230.

Ohzuku, T. et al. (May 1995). "Zero-Strain Insertion Material of $Li[Li_{1/3}Ti_{5/3}]O_4$ for Rechargeable Lithium Cells," *Journal of the Electrochemical Society* 142(5)1431-1435.

Peramunage, D. et al. (1998). "Preparation and Battery Applications of Micron Sized $Li_4Ti_5O_{12}$," *Materials Research Society Symposium Proceedings* 498:359-365.

Peramunage, D. et al. (Aug. 1998). "Preparation of Micron-Sized $Li_4Ti_5O_{12}$ and its Electrochemistry in Polyacrylonitrile Electrolyte-Based Lithium Cells," *Journal of the Electrochemical Society* 145(8):2609-2615.

Prosini, P. P. et al. (2001). "$Li_4Ti_5O_{12}$ as Anode in All-Solid State, Plastic, Lithium-Ion Batteries for Low-Power Applications," *Solid State Ionics* 144:185-192.

Pyun, S.-I. et al. (1999). "Lithium Transport Through $Li_{1+\delta}[Ti_{2-y}Li_y]O_4$ (y=0; 1/3) Electrodes by Analysing Current Transients Upon Large Potential Steps," *Journal of Power Sources* 81-82:248-254.

Robertson, A. D. et al. (1999). "New Inorganic Spinel Oxides for Use as Negative Electrode Materials in Future Lithium-Ion Batteries," *Journal of Power Sources* 81-82:352-357.

U.S. Office Action mailed Feb. 5, 2008, for U.S. Appl. No. 10/485,451, filed Jan. 29, 2004, 5 pages.

U.S. Appl. No. 12/016,973, filed Jan. 18, 2008 for House.

U.S. Appl. No. 12,016,977, filed Jan. 18, 2008 for House.

Zaghib, K. et al. (1999). "Electrochemical Study of $Li_4Ti_5O_{12}$ as Negative Electrode for Li-ion Polymer Rechargeable Batteries," *Journal of Power Sources* 81-82:300-305.

Allen, J. L. et al. (2006). "Low Temperature Performance of Nanophase $Li_4Ti_5O_{12}$," *Journal of Power Sources* 159:1340-13453.

Fong, R. et al. (Jul. 1990). "Studies of Lithium Intercalation into Carbons Using Nonaqueous Electrochemical Cells," *The Journal of the Electrochemical Society* 137(7):2009-20013.

International Search Report and Written Opinion mailed Jun. 2, 2008, for PCT Application No. PCT/US2008/051509 filed Jan. 18, 2008, 21 pages.

International Search Report and Written Opinion mailed Jun. 2, 2008, for PCT Application No. PCT/US2008/051515 filed Jan. 18, 2008, 21 pages.

U.S. Office Action mailed Jun. 6, 2008, for U.S. Appl. No. 11/088,529, filed Mar. 24, 2005, 8 pages.

\* cited by examiner

METHOD FOR PREPARING A LITHIUM ION CELL

CROSS REFERENCE TO RELATED APPLICATION

The present application claims priority to earlier filed U.S. Provisional Application Ser. No. 60/909,361, filed on Mar. 30, 2007, which is incorporated herein by reference in its entirety for all purposes.

FIELD

The apparatus and methods described herein generally relates to a method for preparing electrodes for lithium ion cells.

BACKGROUND

Electrode materials with increased specific surface area and decreased particle size are used in lithium ion cells that require a high charge and discharge rate. The required surface area and particle size is typically achieved through ball milling, jet milling, or hammer milling the materials.

There is a need in the art for another method of preparing electrode materials that affords increased specific surface area and decreased particle size.

SUMMARY

The apparatus and methods described herein generally relate to a method for preparing electrodes for lithium ion cells, where both the positive and negative electrodes of the cell include metal oxides processed according to the methods described herein.

DETAILED DESCRIPTION

Figure 1:
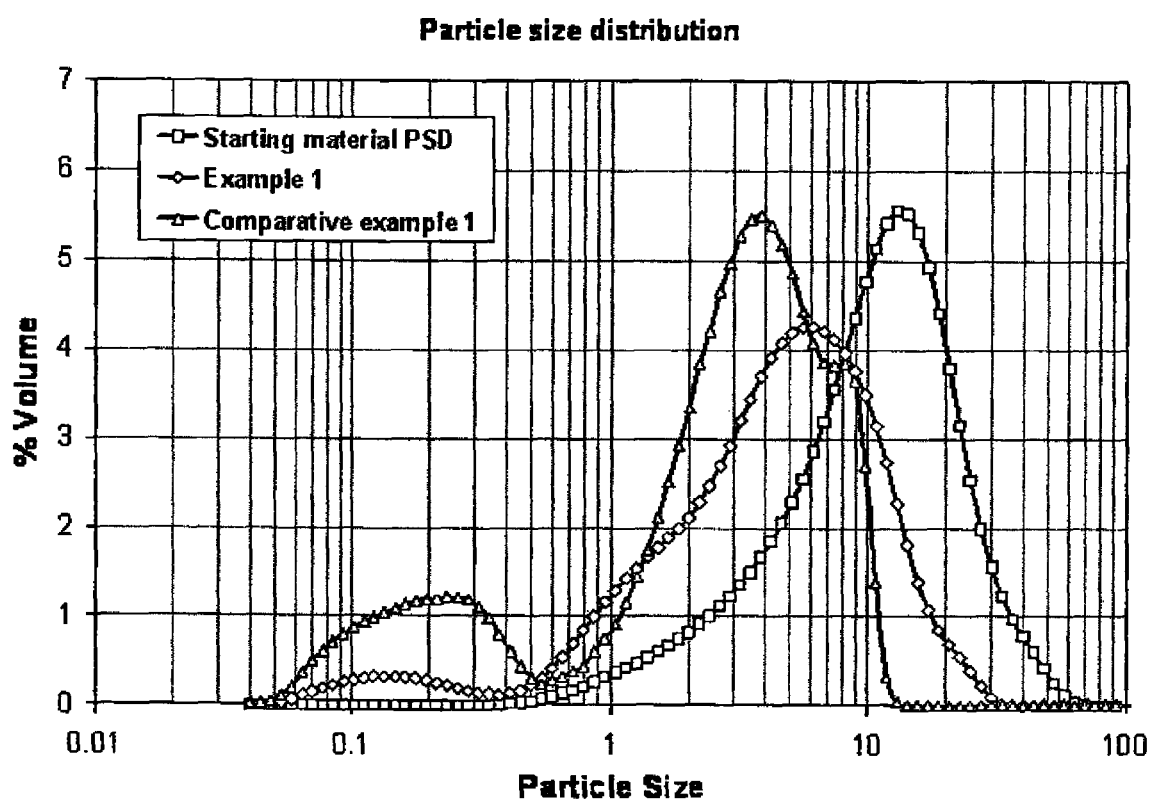
FIG. 1 is a graph illustrating the comparison between the particle size distributions of the starting $Li_4Ti_5O_{12}$ material, the same material pulverized by air pressure oscillation and the same material pulverized by a jet milling process.

In order to provide a more thorough understanding of the apparatus and methods described herein, the following description sets forth numerous specific details, such as methods, parameters, examples, and the like. It should be recognized, however, that such description is not intended as a limitation on the scope of the apparatus and methods described herein, but rather is intended to provide a better understanding of the possible variations.

The apparatus and methods described herein generally relate to a method for preparing electrodes for lithium ion cells, where both the positive and negative electrodes of the cells include metal oxides processed according to the methods described herein.

An electrochemical cell is a device used for creating an electron differential between two electrodes—an anode and cathode. The current is caused by reactions releasing and accepting electrons at the different ends of a conductor. In lithium-ion batteries, a lithium ions move between the anode and cathode. Lithium-ion cell electrodes can be manufactured from an array of materials, including without limitation, particles made of $Li_4Ti_5O_{12}$ (anode) and $LiMn_2O_4$ (cathode).

Lithium ion cell electrode materials are typically processed using mechanical impact forces (e.g., shearing, crushing, grinding, and impacting with a non-particle surface) to reduce particle size and increase specific surface area of the material. The method described herein, in contrast, use pulverizing techniques to accomplish the same objective with fewer cracks and fractures in the electrode material. In some variations the pulverizing techniques include, but are not limited to, aerodynamic forces. In some variations, the aerodynamic forces can be applied to the material through fluid pressure oscillation via a vortex mill. In some variations, the fluid includes air. In some variations, the fluid includes any other gas, without limitation, nitrogen, oxygen, carbon dioxide, helium, neon, argon, krypton, xenon, radon, ununoctium, or any other gas or any combination of the foregoing. One non-limiting example of an apparatus that can be used to apply aerodynamic forces and fluid pressure oscillation to electrode materials is the Super Fine Vortex Mill (Hydan Technologies, Hillsborough, N.J.).

Many different milling devices are known as described for example in U.S. Pub. No. 20030155454. These include, for example, grinding mills, ball mills, rod mills, impact mills, jet mills and vortex mills. In order to obtain particle comminution, most mills rely on mechanical impact forces—an interaction between the particulate solid and another surface, such as the balls in a ball mill or impact surface in an impact mill, except for the vortex mill. Such mechanical impact forces produce cracks and fractures in the material crystallites or in crystallite aggregates, and yield a significant amount of fines. In contrast, vortex mills do not rely on interaction with other surfaces to effectively pulverize particles, thus result in fewer cracks and fractures during milling.

In some variations of jet mills, the particulate solids to be milled are introduced into a chamber where the working fluid is accelerated to a high speed using venturi nozzles. Moving at a high speed, particles collide with a target such as a deflecting surface. In some variations of jet mills, particles are milled as a consequence of a collision effect. In some variations, operating speeds of particles in jet mills are not less than 150-300 m/s. Such jet mills are described for example in U.S. Pat. No. 5,133,504. In some variations, introduced coarse particles collide with intersecting high speed fluid jets, to achieve a higher collision speed, as described for example in U.S. Pat. No. 4,546,926.

In some variations, vortex chambers which perform resonance whirl or vortex milling can be utilized. This milling process differs significantly from jet milling. For example, the particle speed in vortex chambers is considerably lower than that in jet mills and the high-speed injection of feed particles into jet mills is unnecessary in vortex mills. Fluid speed through the nozzles of a vortex chamber is generally in the range 50-130 m/s, and particle rotational speed in the vortex chamber no more than 50 m/s. At such low speeds, jet mills become ineffective. Referring to WO 94/08719, WO 98/52694 and SU 1,457,995, vortex chamber milling devices, fitted with tangential fluid injection nozzles, carry out "resonance vortex grinding." In some variations, the working chamber includes a generally cylindrical body with one or more openings for the introduction of particulate solids. In some variations, during the milling process, particles reaching the required particle size range are continuously discharged via an axial discharge duct. In some variations, sound generators may be provided in the inlet fluid nozzles for interacting with the incoming fluid flow, thereby enhancing the grinding operation as described in WO 94/08719. In some variations, the chamber may be provided with a rotatable internal side-wall adapted for rotation in the direction opposite to the direction of rotation of the vortex as described in SU 1,457,995.

In some variations, whirl or vortex chambers can be used in conjunction with jet mills for the classification or sorting of the ground material emerging from jet milling. In such combined systems the relatively coarse particles are recirculated from the whirling classifier back into the jet mill. Such systems are described, for example, in U.S. Pat. No. 4,219,164, U.S. Pat. No. 4,189,102 and U.S. Pat. No. 4,664,319.

In some variations, the combination of jet milling with a vortex chamber can be utilized as described in U.S. Pat. No. 4,502,641. In some variations, material to be milled can be introduced through a venturi nozzle into a vortex chamber at a speed of about 300 m/s. In some variations, a fluid vortex rotating at a substantially lower speed can be used in the vortex chamber. In some variations, particles injected into the chamber rotate in the relatively slow fluid vortex and become targets for further high speed particles injected through the venturi nozzle. In some variations, collision between particles moving in the vortex and particles introduced through the venturi nozzle results in impact comminution.

Electrodes can be constructed of pulverized electrode material particles. The required surface area and particle size can be achieved with an array of milling techniques, as discussed above. For example, a positive electrode can be constructed by milling $LiNi_{1/3}Co_{1/3}Mn_{1/3}O_2$ particles using air pressure oscillation in a vortex mill to achieve particles that are 7 microns in diameter and have a BET specific surface area of 5.6 $m^2/g$.

In some variations, the pulverized electrode particles can then be mixed with a binder and solvent to form a slurry. In some variations, the slurry can then be spread onto a substrate. In some variations, the solvent can then be removed, forming a dry electrode. In some variations, the electrode can then be cut into a appropriate size and form.

Continuing with the above example, the pulzerized $LiNi_{1/3}Co_{1/3}Mn_{1/3}O_2$ particles could be mixed with 10% carbon black and 8% Polyvinylidene Fluoride binder and dissolved in N-Methyl-2-pyrrolidone solvent. The slurry could be spread on aluminum foil and heated to evaporate the N-Methyl-2-pyrrolidone solvent. The dry electrode can then be cut into a rectangular having a 2" by 3" size of about 38 $cm^2$ and a film thickness of about 0.020 mm.

When electrodes are constructed using materials processed according to the methods described herein and then placed in an electrochemical cell that is subsequently activated, the cell exhibits superior performance parameters vis-à-vis a cell that contains electrode materials processed using mechanical impact forces of shearing, crushing, grinding, and impacting with a non-electrode material surface.

Typically, an electrochemical cell using the technology of the methods described herein exhibits specific power—as measured in a 10 second pulse charge and discharge test—at least 10% higher than that of a cell using materials that have been processed with mechanical impact forces of shearing, crushing, grinding, and impacting with a non-electrode material surface. Oftentimes it exhibits specific power at least 20%, 30% or 40% higher. In certain cases, it exhibits specific power at least 50%, 60% or 70% higher.

Typically, an electrochemical cell using the technology of the methods described herein exhibits Electrochemical Impedance Spectroscopy impedance at least 10% lower than that of a cell using materials that have been processed with mechanical impact forces of shearing, crushing, grinding, and impacting with a non-electrode material surface. Oftentimes it exhibits Electrochemical Impedance Spectroscopy impedance at least 20%, 30% or 40% lower. In certain cases, it exhibits Electrochemical Impedance Spectroscopy impedance at least 50%, 75% or 100% lower. Electrochemical Impedance Spectroscopy (EIS) is the probing of energy storage and dissipation properties over a range of frequencies, by means of impedance.

Typically, an electrochemical cell using the technology of the methods described herein exhibits a cycle life (maintenance of at least 90% cell capacity) at least 10% higher than that of a cell using materials that have been processed with mechanical impact forces of shearing, crushing, grinding, and impacting with a non-electrode material surface. Oftentimes it exhibits a cycle life at least 25%, 50%, 75% or 100% greater. In certain cases, it exhibits a cycle life at least 250%, 500% or 750% greater.

In some variations, the methods described herein includes a method for preparing an electrode for a lithium ion cell by pulverizing lithium metal oxide particles were the specific surface area of the pulverized particles is greater than the specific surface area of the original lithium metal oxide particles and the particle size of the pulverized particles is less than the particle size of the original lithium metal oxide particles. The pulverizing does not include the use of shearing, crushing, grinding, or impacting the lithium metal oxide particles with a non-particle surface. The slurry including the pulverized particles and a solvent is formed. The slurry is spread onto a substrate. The solvent is removed from the spread slurry.

In some variations, the electrode can be a negative electrode formed with $LiTi_2O_4$ particles; $Li_4Ti_5O_{12}$ particles; $Li1+xTi2-xO4$ particles where $0<x<0.33$; and/or $Li1+xTi2-x-yMyO4$ particles where $0<x<0.33$, $0<y<0.6$ and M is metal that is not lithium or titanium.

In some variations, the electrode can be a positive electrode formed with $Li1+xMn2-x-yMyO4$ where $0<x<0.33$ and $0<y<0.6$ and M is a metal that is not lithium or manganese; $LiCoxMyO2$ where $x+y$ is about 1 and M is a metal that is not lithium or cobalt; $LiNixCoyMzO2$ where $x+y+z$ is about 1 and M is a metal that is not lithium, nickel or cobalt; and/or $LiFePO4$.

In some variations, the pulverizing can include the use of aerodynamic forces. In some variations, the pulverizing can include the use of a vortex mill. In some variations, the pulverizing can include the use of air pressure oscillation.

In some variations, the mean particle size of the pulverized particles that are created to form a negative electrode can range from 1 to 10 µm, 1 to 15 µm, 1 to 20 µm, or 10 to 20 µm. In some variations, the mean particle size of the pulverized particles that are created to form a positive electrode can range from 1 to 10 µm, 1 to 15 µm, 1 to 20 µm, or 10 to 20 µm.

In some variations, the specific surface area of the pulverized particles that are created to form a negative electrode can range from 5 m$^2$/g to 120, m$^2$/g 15 m$^2$/g to 100 m$^2$/g, 20 m$^2$/g to 80 m$^2$/g, or 30 m$^2$/g to 70 m$^2$/g. In some variations, the specific surface area of the pulverized particles that are created to form a positive electrode can range from 1 m$^2$/g to 20 m$^2$/g, 2 m$^2$/g to 8 m$^2$/g, or 3 m$^2$/g to 7 m$^2$/g.

In some variations, the apparatus described herein includes an electrode for a lithium ion cell that is constructed from pulverized lithium metal oxide particles that have been pulverized with aerodynamic forces. The pulverized lithium metal oxide particles have less fractures than that of comparable particles that have been processed by pulverizing the comparable particles with shearing, crushing, grinding, or impacting forces.

In some variations, the electrode can be a negative electrode formed with LiTi2O4 particles; Li4Ti5O12 particles; Li1+xTi2−xO4 particles where 0<x<0.33; and/or Li1+xTi2−x−yMyO4 particles where 0<x<0.33, 0<y<0.6 and M is metal that is not lithium or titanium.

In some variations, the electrode can be a positive electrode formed with Li1+xMn2−x−yMyO4 where 0<x<0.33 and 0<y<0.6 and M is a metal that is not lithium or manganese; LiCoxMyO2 where x+y is about 1 and M is a metal that is not lithium or cobalt; LiNixCoyMzO2 where x+y+z is about 1 and M is a metal that is not lithium, nickel or cobalt; and/or LiFePO4.

In some variations, the pulverizing can include the use of a vortex mill. In some variations, the pulverizing can include the use of air pressure oscillation.

In some variations, the mean particle size of the pulverized particles that are created to form a negative electrode can range from 1 to 10 µm, 1 to 15 µm, 1 to 20 µm, or 10 to 20 µm. In some variations, the mean particle size of the pulverized particles that are created to form a positive electrode can range from 1 to 10 µm, 1 to 15 µm, 1 to 20 µm, or 10 to 20 µm.

In some variations, the specific surface area of the pulverized particles that are created to form a negative electrode can range from 5 m$^2$/g to 120, m$^2$/g 15 m$^2$/g to 100 m$^2$/g, 20 m$^2$/g to 80 m$^2$/g, or 30 m$^2$/g to 70 m$^2$/g. In some variations, the specific surface area of the pulverized particles that are created to form a positive electrode can range from 1 m$^2$/g to 20 m$^2$/g, 2 m$^2$/g to 8 m$^2$/g, or 3 m$^2$/g to 7 m$^2$/g.

In some variations, the apparatus described herein includes a lithium ion cell made from electrodes constructed from pulverized lithium metal oxide particles that have not been processed by pulverizing the lithium metal oxide particles with shearing, crushing, grinding, or impacting forces with a non-particle surface. The lithium ion cell exhibits electrochemical impedance spectroscopy impedance at least 10%, 20%, 30%, 40%, 50%, 60%, 70%, 80%, 90%, or 100% lower than that of a comparable lithium ion cell made from electrodes constructed from comparable lithium metal oxide particles that have been processed by pulverizing the comparable lithium metal oxide particles with shearing, crushing, grinding, or impacting forces with a non-particle surface.

In some variations, the apparatus described herein includes a lithium ion cell made from electrodes constructed from pulverized lithium metal oxide particles that have not been processed by pulverizing the lithium metal oxide particles with shearing, crushing, grinding, or impacting forces with a non-particle surface. The lithium ion cell exhibits a specific power at least 10%, 20%, 30%, 40%, 50%, 60%, 70%, or 80% greater than that of a comparable lithium ion cell made from electrodes constructed from comparable lithium metal oxide particles that have been processed by pulverizing the comparable lithium metal oxide particles with shearing, crushing, grinding, or impacting forces with a non-particle surface.

In some variations, the apparatus described herein includes a lithium ion cell made from electrodes constructed from pulverized lithium metal oxide particles that have not been processed by pulverizing the lithium metal oxide particles with shearing, crushing, grinding, or impacting forces with a non-particle surface. The lithium ion cell exhibits a cycle life at least 25%, 50%, 75%, 100%, 150%, 200%, 250%, 300%, 350%, 400%, 450%, 500%, 600% or 750% greater than that of a comparable lithium ion cell made from electrodes constructed from comparable lithium metal oxide particles that have been processed by pulverizing the comparable lithium metal oxide particles with shearing, crushing, grinding, or impacting forces with a non-particle surface.

In some variations, electrodes created by the methods described herein can include, without limitation, lithium (Li), sodium (Na), potassium (K), rubidium (Rb), caesium (Cs), francium (Fr), beryllium (Be), magnesium (Mg), calcium (Ca), strontium (Sr), barium (Ba) and radium (Ra), scandium (Sc), yttrium (Y), lanthanum (La), actinium (Ac), titanium (Ti), zirconium (Zr), hafnium (Hf), rutherfordium (Rf), vanadium (V), niobium (Nb), tantalum (Ta), dubnium (Db), chromium (Cr), molybdenum (Mo), tungsten (W), seaborgium (Sg), manganese (Mn), technetium (Tc), rhenium (Re), bohrium (Bh), iron (Fe), ruthenium (Ru), osmium (Os), hassium (Hs), cobalt (Co), rhodium (Rh), iridium (Ir), meitnerium (Mt), nickel (Ni), palladium (Pd), platinum (Pt), darmstadtium (Ds), copper (Cu), silver (Ag), gold (Au), zinc (Zn), cadmium (Cd), mercury (Hg), ununbium (Uub), aluminium (Al), gallium (Ga), indium (In), thallium (Tl), tin (Sn), lead (Pb), or any combination of the foregoing.

In some variations, electrodes created by the methods described herein can include, without limitation, non-stoichiometric compounds. One non-limiting example is LiNi$_{1/3}$Co$_{1/3}$Mn$_{1/3}$O$_2$. Non-stoichiometric compounds are chemical compounds with an elemental composition that cannot be represented by a ratio of integers. Typically, non-stoichiometric compounds are solids that contain crystallographic point defects that result in the excess or deficiency of an element. Since solids are overall electrically neutral, the defect is compensated by a change in the charge of other atoms in the solid, either by changing their oxidation state, or by replacing them with atoms of different elements with a different charge. Nonstoichiometry is common in transition metal oxides, especially when the metal is not in its highest oxidation state.

EXAMPLE 1

Li$_4$Ti$_5$O$_{12}$ negative electrode materials with a mean particle size of 14 microns, specific surface area (BET) of 43 m$^2$/g, and a mean crystallite size of about 40 nanometers was prepared as described in U.S. Pat. No. 6,890,510. The material was subjected to air pressure oscillation according to the methods described herein to reduce the mean particle size of the starting material to about 4 microns. For a comparative study, a different portion of the material was pulverized using a jet mill to the same mean particle size.

FIG. 1 shows the particle size distribution of the starting Li$_4$Ti$_5$O$_{12}$ material, the particle size distribution of the material pulverized using air pressure oscillation and the particle size distribution of the same starting material pulverized using a jet mill technique. As shown, jet milling produced a significantly larger amount of fines than the air pressure oscillation method.

EXAMPLE 2

An electrochemical cell was prepared. The negative electrode was constructed of $Li_4Ti_5O_{12}$ processed using air pressure oscillation as in Example 1; the positive electrode was constructed of battery grade $LiNi_{1/3}Co_{1/3}Mn_{1/3}O_2$ processed the same way (particle size of about 7 microns and BET specific surface area of 5.6 $m^2/g$).

The negative electrode was formed using the following steps: mixing the $Li_4Ti_5O_{12}$ with 10% carbon black and 8% Polyvinylidene Fluoride (PVDF) binder dissolved in N-Methyl-2-pyrrolidone (NMP) solvent to form a slurry; the slurry was spread on aluminum foil and heated to evaporate the NMP solvent; the dry electrode was calendared and cut into a rectangular sample electrode having a 2" by 3" size of about 38 $cm$ and a film thickness of about 0.015 mm.

The positive electrode was prepared with $LiNi_{1/3}Co_{1/3}Mn_{1/3}O_2$ using the same procedure described for preparation of the negative electrode. The only difference was that the positive electrode film thickness was about 0.020 mm.

The two prepared electrodes were placed inside a soft pack electrochemical cell with $EC:EMC/LiPF_6$ electrolyte. One charge-discharge cycle was conducted as a cell formation step. After 24 hours, the cell was charged to 70% of its capacity and Electrochemical Impedance Spectroscopy impedance measurements were conducted in the frequency range $10^5$-$10^{-2}$ Hz with 10 mV amplitude.

COMPARATIVE EXAMPLE 2

An electrochemical cell with the same negative electrode as in Example 2 but with simple battery grade $LiNi_{1/3}Co_{1/3}Mn_{1/3}O_2$ was prepared according to Example 2. After the formation step, the cell was charged to 70% of its capacity and Electrochemical Impedance Spectroscopy impedance measurements were conducted as in Example 2.

Figure 2:
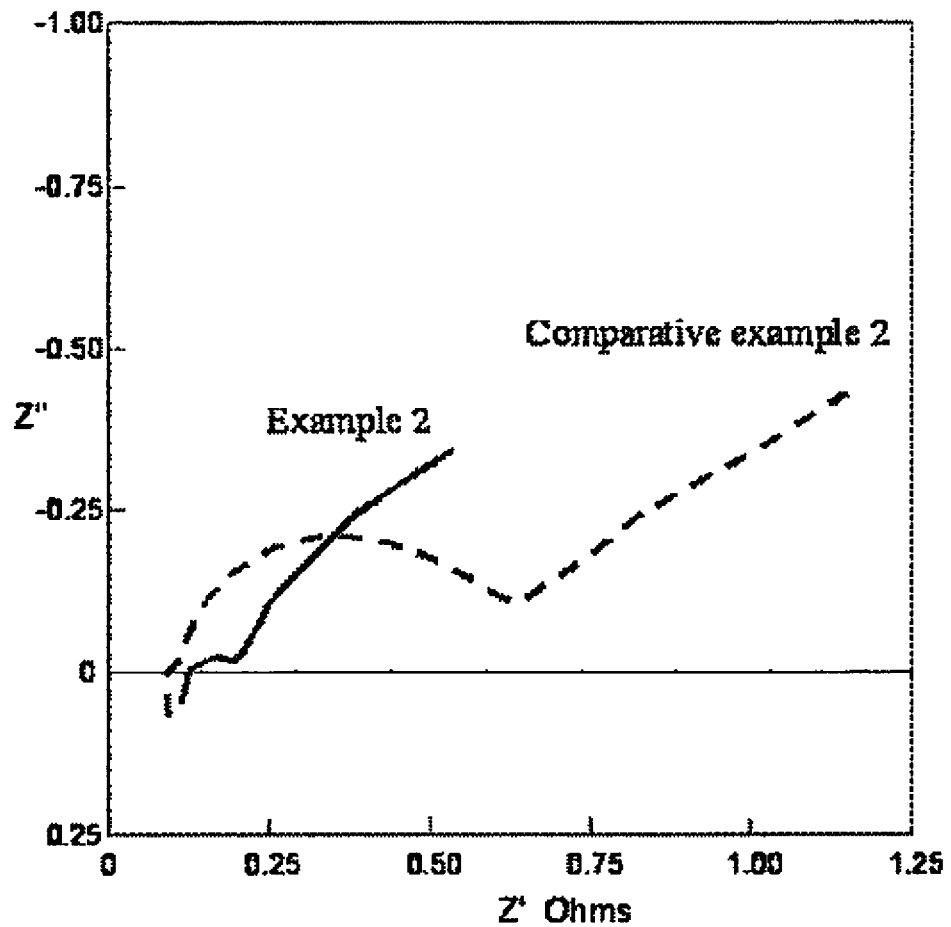
FIG. 2 is a graph illustrating the comparison between the Electrochemical Impedance Spectroscopy (EIS) impedance of a cell with battery grade $LiNi_{1/3}Co_{1/3}Mn_{1/3}O_2$ positive electrode material prepared according to the method described herein compared with the EIS impedance of a cell constructed with simple (i.e., "as received" or general grade) $LiNi_{1/3}Co_{1/3}Mn_{1/3}O_2$ electrode material.

The comparison of Electrochemical Impedance Spectroscopy impedance of the cells prepared the two different ways is shown in FIG. 2. The impedance of the Example 2 cell as compared to the Comparative Example 2 cell was approximately ½.

EXAMPLE 3

Battery grade $LiMn_2O_4$ with a mean particle size of 11 microns and a specific surface area (BET) 0.9 $m^2/g$ was pulverized using air pressure oscillation. This decreased the material's mean particle size to about 3 microns and increased its specific surface area (BET) to about 3.5 $m^2/g$. A cell was assembled with the $LiMn_2O_4$ positive electrode material following the same procedure described in Example 2. After the formation step, the cell was subjected to a 10 second pulse power characterization test that included 10 second charge and discharge pulse power characterization between 10% and 90% state of discharge (SOD) in 10% SOD steps.

COMPARATIVE EXAMPLE 3

A cell with simple battery grade $LiMn_2O_4$ as the positive electrode material was assembled using the same procedure described in Example 2. After the formation step, the cell was subjected to the same 10 seconds pulse power characterization test between 10% and 90% SOD described in Example 3.

Figure 3:
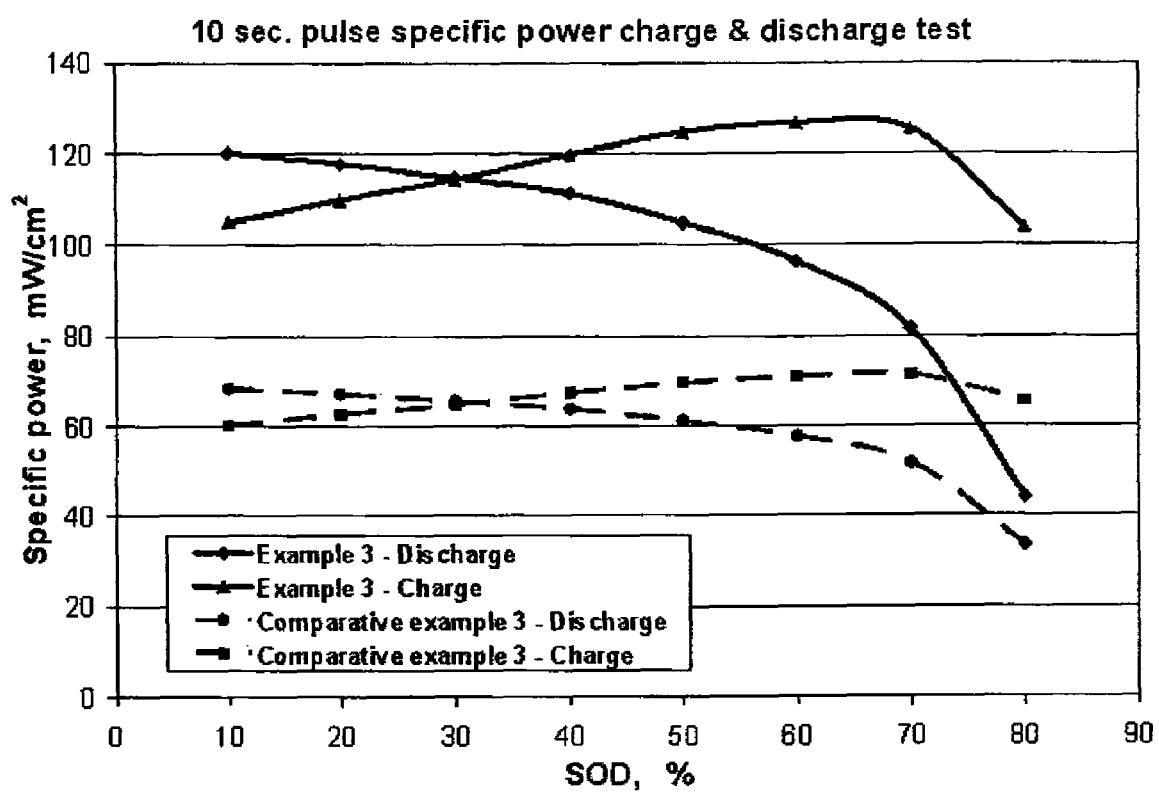
FIG. 3 is a graph illustrating the comparison between a 10 second pulse charge and discharge power of a cell with $LiMn_2O_4$ positive electrode material prepared according to the method described herein compared with the power of a cell constructed with simple $LiMn_2O_4$ electrode material.

The comparison of 10 second pulse specific charge and discharge power of the cells prepared according to Example 3 and Comparative Example 3 are shown in FIG. 3. The specific power of the cell with $LiMn_2O_4$ material processed according to the methods described herein has about 70% higher specific power than the cell prepared with battery grade $LiMn_2O_4$.

EXAMPLE 4

A cell with $LiNi_{1/3}Co_{1/3}Mn_{1/3}O_2$ processed using air pressure oscillation as the positive electrode material was constructed according to Example 2. After the cell formation step, the cell was subjected to a 100% depth of discharge (DOD) cycle test at 2C (30 min) charge and 2C (30 min) discharge rates.

COMPARATIVE EXAMPLE 4

A cell prepared with simple battery grade $LiNi_{1/3}Co_{1/3}Mn_{1/3}O_2$ as the cathode material was prepared as in Example 2. After cell formation, the cell was subjected to a 100% DOD cycle test at 2C (30 min) charge and 2C (30 min) discharge rate as in Example 4.

Figure 4:
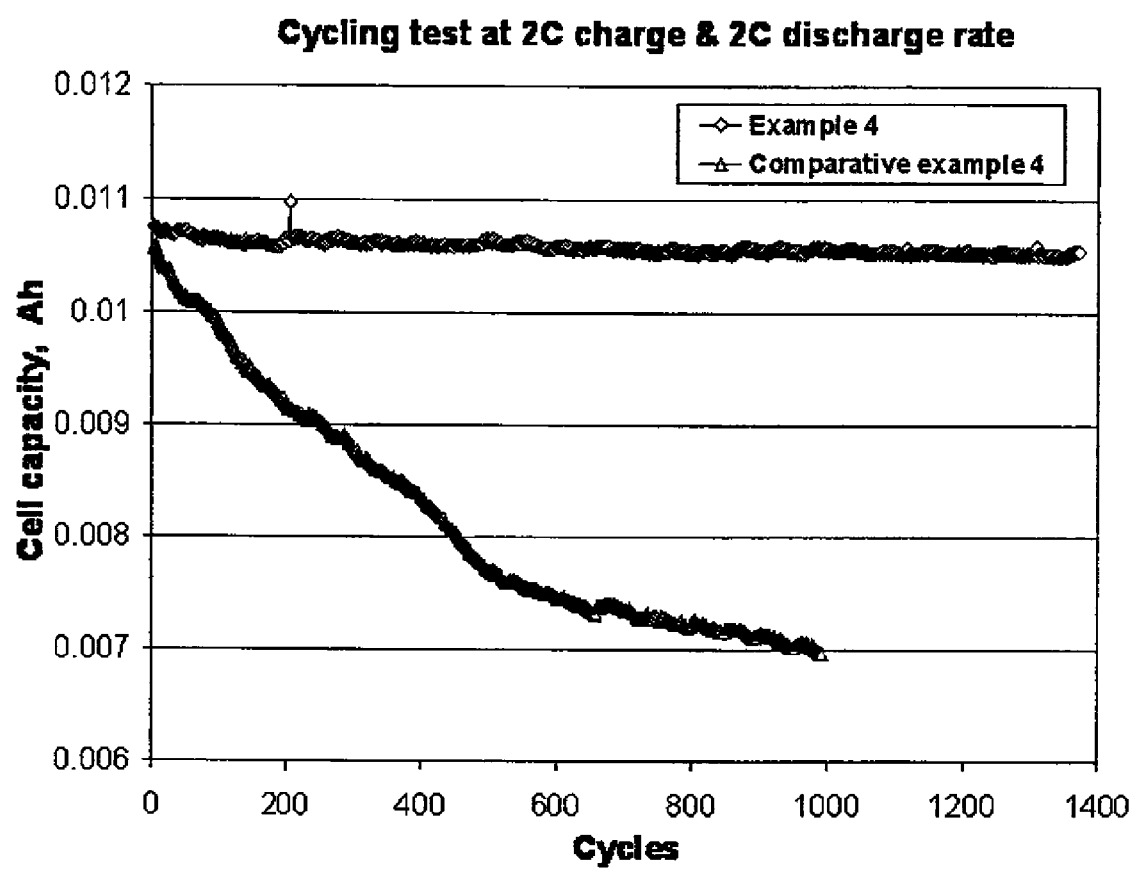
FIG. 4 is a graph of cell capacity vs. charge-discharge cycles illustrating the cycling performance of a cell having a positive electrode constructed of battery grade $LiNi_{1/3}Co_{1/3}Mn_{1/3}O_2$ pulverized according to the method described herein, and the cycling performance of a cell using simple $LiNi_{1/3}Co_{1/3}Mn_{1/3}O_2$.

A comparison of the cycle life of the cells prepared according to Example 4 and Comparative Example 4 is shown in FIG. 4. The cycle life of the cell of Example 4 showed a substantially better cycle life.

EXAMPLE 5

A cell using $LiMn_2O_4$ as the positive electrode material was prepared following the procedure described in Example 3. After formation, the cell was subjected to a 100% DOD cycling test at 10C (6 min) charge and 10C (6 min) discharge rate.

COMPARATIVE EXAMPLE 5

A cell was prepared with jet milled $LiMn_2O_4$ (specific area of about 3.5 $m^2/g$) as the positive electrode material exactly as described in example 3. After cell formation, the cell was subjected to a 100% DOD cycle test at 10C (6 min) charge and 10C (6 min) discharge rates.

Figure 5:
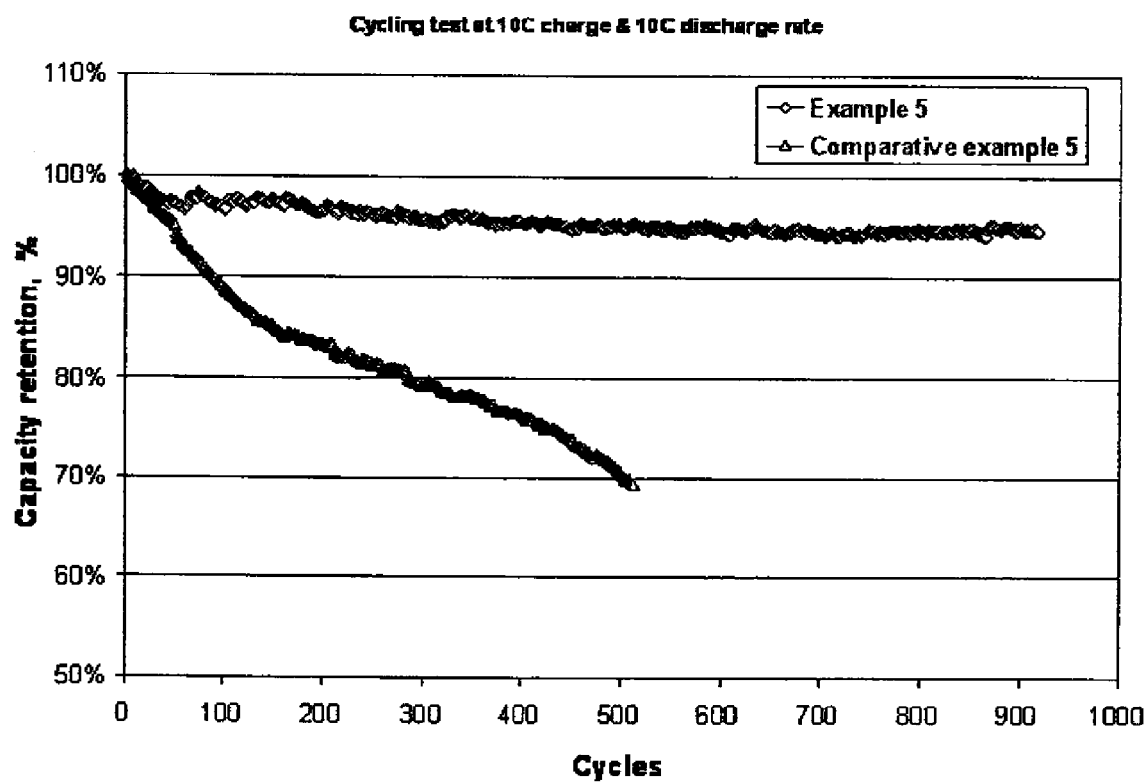
FIG. 5 is a graph of cell capacity retention vs. charge-discharge cycles illustrating the cycling performance of a cell with a positive electrode constructed of manganese spinel pulverized according to the method described herein as compared with a cell using manganese spinel pulverized by a jet milling process.

A comparison of the cycle life of the cells prepared according to Example 5 and Comparative Example 5 is shown in FIG. 5. The cycle life of the Example 5 cell is significantly better than the cycle life of the cell prepared with jet milled $LiMn_2O_4$.

Although the apparatus and methods described herein have been described in connection with some embodiments, it is not intended to be limited to the specific form set forth herein. Rather, the scope of the apparatus and methods described herein is limited only by the claims. Additionally, although a feature may appear to be described in connection with particular embodiments, one skilled in the art would recognize that various features of the described embodiments may be combined in accordance with the apparatus and methods described herein.

Furthermore, although individually listed, a plurality of means, elements or method steps may be implemented by, for example, a single apparatus or method. Additionally, although individual features may be included in different claims, these may be advantageously combined, and the inclusion in different claims does not imply that a combination of features is not feasible and/or advantageous. Also, the inclusion of a feature in one category of claims does not imply a limitation to this category, but rather the feature may be equally applicable to other claim categories, as appropriate.

Terms and phrases used in this document, and variations thereof, unless otherwise expressly stated, should be construed as open ended as opposed to limiting. As examples of the foregoing: the term "including" should be read to mean "including, without limitation" or the like; the terms "example" or "some variations" are used to provide exemplary instances of the item in discussion, not an exhaustive or limiting list thereof; and adjectives such as "conventional," "traditional," "normal," "standard," "known" and terms of similar meaning should not be construed as limiting the item described to a given time period or to an item available as of a given time, but instead should be read to encompass conventional, traditional, normal, or standard technologies that may be available or known now or at any time in the future. Likewise, a group of items linked with the conjunction "and" should not be read as requiring that each and every one of those items be present in the grouping, but rather should be read as "and/or" unless expressly stated otherwise. Similarly, a group of items linked with the conjunction "or" should not be read as requiring mutual exclusivity among that group, but rather should also be read as "and/or" unless expressly stated otherwise. Furthermore, although items, elements or components of apparatus and methods described herein may be described or claimed in the singular, the plural is contemplated to be within the scope thereof unless limitation to the singular is explicitly stated. The presence of broadening words and phrases such as "one or more," "at least," "but not limited to," "in some variations" or other like phrases in some instances shall not be read to mean that the narrower case is intended or required in instances where such broadening phrases may be absent.

The invention claimed is:

1. A method for preparing an electrode for a lithium ion cell, wherein the method comprises the following steps:
   a) providing lithium metal oxide particles with a specific surface area and particle size;
   b) pulverizing the lithium metal oxide particles with a vortex mill to provide pulverized particles with a specific surface area and particle size, wherein the specific surface area of the pulverized particles is greater than the specific surface area of the lithium metal oxide particles and the particle size of the pulverized particles is less than the particle size of the lithium metal oxide particles, and wherein the pulverizing does not comprise the use of shearing, crushing, grinding, or impacting particles with a non-particle surface;
   c) forming a slurry comprising the pulverized particles and a solvent;
   d) spreading the slurry onto a substrate to form a spread slurry; and
   e) removing the solvent from the spread slurry thereby providing the electrode.

2. The method according to claim 1, wherein the electrode is a negative electrode and wherein the lithium metal oxide particles are selected from a group consisting of $LiTi_2O_4$ particles, $Li_4Ti_5O_{12}$ particles, $Li_{1+x}Ti_{2-x}O_4$ particles where $0 \leq x \leq 0.33$, and $Li_{1+x}Ti_{2-x-y}M_yO_4$ where $0 \leq x \leq 0.33$, $0 \leq y \leq 0.6$ and M is a metal that is not lithium or titanium.

3. The method according to claim 1, wherein the electrode is a positive electrode and wherein the lithium metal oxide particles are selected from a group consisting of $Li_{1+x}Mn_{2-x-y}M_yO_4$ where $0 \leq x \leq 0.33$ and $0 \leq y \leq 0.6$ and M is a metal that is not lithium or manganese; $LiCo_xM_yO_2$ where x+y is about 1 and M is a metal that is not lithium or cobalt; $LiNi_xCo_yM_zO_2$ where x+y+z is about 1 and M is a metal that is not lithium, nickel or cobalt; and $LiFePO_4$.

4. The method according to claim 2, wherein the lithium metal oxide particles are $Li_4Ti_5O_{12}$ particles.

5. The method according to claim 3, wherein the lithium metal oxide particles are $LiMn_2O_4$ particles.

6. The method according to claim 2, wherein the pulverizing comprises the use of air pressure oscillations.

7. The method according to claim 3, wherein the pulverizing comprises the use of air pressure oscillations.

8. The method according to claim 6, wherein the mean particle size of the pulverized particles ranges from 1 to 15 µm.

9. The method according to claim 7, wherein the mean particle size of the pulverized particles ranges from 1 to 10 µm.

10. The method according to claim 8, wherein the specific surface area of the pulverized particles ranges from 15 $m^2/g$ to 100 $m^2/g$.

11. The method according to claim 9, wherein the specific surface area of the pulverized particles ranges from 2 $m^2/g$ to 8 $m^2/g$.

12. The method according to claim 10, wherein the specific surface area of the pulverized particles ranges from 20 $m^2/g$ to 80 $m^2/g$.

* * * * *